US006003431A

United States Patent [19]

Bertini

[11] Patent Number: 6,003,431

[45] Date of Patent: Dec. 21, 1999

[54] ROTARY ACTUATOR

[76] Inventor: Millo Bertini, 679 Garden St., Trumbull, Conn. 06611

[21] Appl. No.: 09/059,839

[22] Filed: Apr. 14, 1998

[51] Int. Cl.$^{6}$ .................................. F16J 1/00; F01B 9/00

[52] U.S. Cl. .................................... 92/30; 92/68; 92/136; 91/405

[58] Field of Search ............................... 92/68, 136, 138, 92/116, 30, 120, 121; 91/404, 405

[56] References Cited

U.S. PATENT DOCUMENTS

| | | | |
|---|---|---|---|
| 2,844,127 | 7/1958 | Steiner | 92/68 |
| 2,946,320 | 7/1960 | Vogel | 92/68 |
| 3,019,771 | 2/1962 | Heese et al. | 92/68 |
| 3,040,717 | 6/1962 | Rumsey | 92/136 X |
| 3,148,595 | 9/1964 | Looney | 92/136 X |
| 3,150,489 | 9/1964 | Dewar | 92/136 X |
| 3,156,160 | 11/1964 | Meyer et al. | 92/136 X |
| 3,253,518 | 5/1966 | Duemler | 92/68 |
| 3,447,423 | 6/1969 | Henry | 92/68 X |
| 3,818,808 | 6/1974 | Shafer | 92/138 |
| 4,370,917 | 2/1983 | Bunyard | 92/68 X |
| 4,392,631 | 7/1983 | DeWald | 92/136 X |
| 4,508,016 | 4/1985 | Weyer | 92/136 X |
| 4,520,994 | 6/1985 | DeWald | 92/138 X |
| 5,076,090 | 12/1991 | Cetnarowski | 92/136 X |

OTHER PUBLICATIONS

Rotary Actuators, Specken–Drumag Company, 64417–2, 1987, pp. 1–11, 1987.

*Primary Examiner*—John E. Ryznic
*Attorney, Agent, or Firm*—Fattibene & Fattibene; Arthur T. Fattibene; Paul A. Fattibene

[57] ABSTRACT

A rotary actuator including a housing provided with a fluid actuated drive assembly operatively connected to a rotary plate arranged to effect the drive thereof, wherein the housing and the rotary plate are provided with complementary cooperating stop abutment and groove or track for limiting the angular rotation of the rotary plate in either the clockwise or counterclockwise rotation. An adjustment is provided to adjust the angular rotation of the rotary plate. Also provided is a control or adjustment for independently regulating the speed of rotation of the rotary plate either in the clockwise or counterclockwise rotation.

19 Claims, 3 Drawing Sheets

ROTARY ACTUATOR

FIELD OF INVENTION

This invention relates to a rotary actuator, and more specifically to a rotary actuator for use in an automatic tool or robotic machine.

BACKGROUND OF THE INVENTION

Heretofore, the known rotary actuators utilized an air driven piston and cylinder drive assembly for driving a pinion gear operatively connected to a rotary plate. In such known actuators, the angular rotation of the rotary plate was determined by the piston engaging a stop to limit the stroke of the piston and thus determining the degree of angular rotation of the rotary plate. However, it has been noted that abruptly limiting or stopping the stroke of the piston by a stop imposed severe impact on the meshing gear teeth of a complementary pinion gear and associated piston rack which, over time, introduced considerable play or backlash and/or damage to the meshing gear teeth to result in greatly reducing the accuracy or precision of the rotary actuator and/or the useful life of the rotary actuator.

SUMMARY OF THE INVENTION

An object of this invention is to provide a rotary actuator in which the rotation of the actuator is determined in a manner whereby the impact imparted on the gearing thereof is eliminated.

Another object of this invention is to provide a rotary actuator wherein the precision and accuracy thereof can be maintained over a longer period of time, thereby increasing the useful life thereof.

Another object of this invention is to provide a rotary actuator in which the degree of angular rotation, in either the clockwise or counterclockwise direction, can be adjusted within predetermined limits.

Another object of this invention is to provide a rotary actuator wherein the speed of rotation in either a clockwise or counterclockwise direction is independently controlled.

Another object is to provide a rotary actuator which is readily simple in construction, can be readily manufactured, and is more durable and accurate in use.

The foregoing objects and other features and advantages are attained by a rotary actuator that includes a housing having formed therein a pair of spaced apart piston chambers. A piston having a rack portion is reciprocally disposed in each of the piston chambers. Connected into communication with each of the respective piston chambers is a fluid inlet for directing an operating fluid medium into the associated cylinder in an alternating manner. Each of the respective piston chambers are interconnected in communication by a passageway so that fluid introduced in one of the fluid outlets will effect the displacement of the piston in each of the respective chambers.

Disposed in meshing relationship with the rack of the respective pistons is a pinion gear to which a rotary plate is connected. Projecting outwardly from the housing is a stop abutment arranged to be received in a complementary arcuate groove formed in the complementary surface of the rotary plate. The arrangement is such that the angular rotation of the rotary plate is determined by the engagement of the end portion of the arcuate groove of the rotary plate with the stop abutment as the rotary plate is driven in one direction or the other. To adjust the limits of the angular rotation of the rotary plate, the ends of the groove may be defined by an adjusting screw.

To independently and individually control the speed of rotation of the rotary plate in one direction or the other, each of the fluid inlets is provided with a bypass controlled by a valve, which are independently adjustable, to control the flow of the exhausting fluid medium from one of the piston chambers as the fluid medium is being introduced into the other piston chamber.

IN THE DRAWINGS

DETAILED DESCRIPTION

Figure 1:
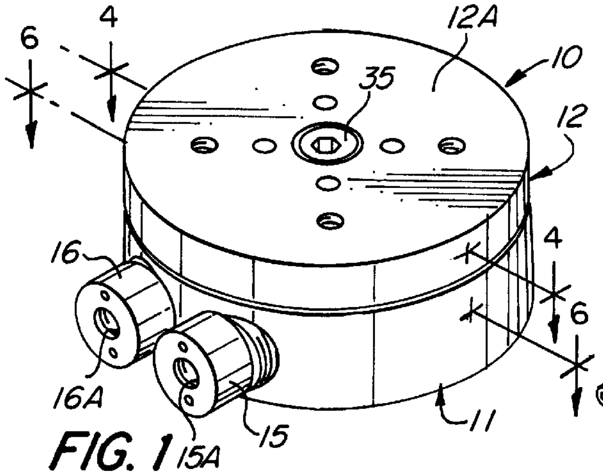
FIG. 1 is a perspective view of a rotary actuator embodying the present invention.

Referring to the drawings, there is illustrated in FIG. 1 a rotary actuator 10 embodying the present invention. The rotary actuator 10 includes a housing 11 and an associated rotary plate 12 mounted thereon to rotate in either a clockwise or counterclockwise direction as viewed in FIG. 1. It will be understood that the upper surface 12A defines a platform for supporting thereon a workpiece (not shown) upon which work is to be performed.

Figure 6:
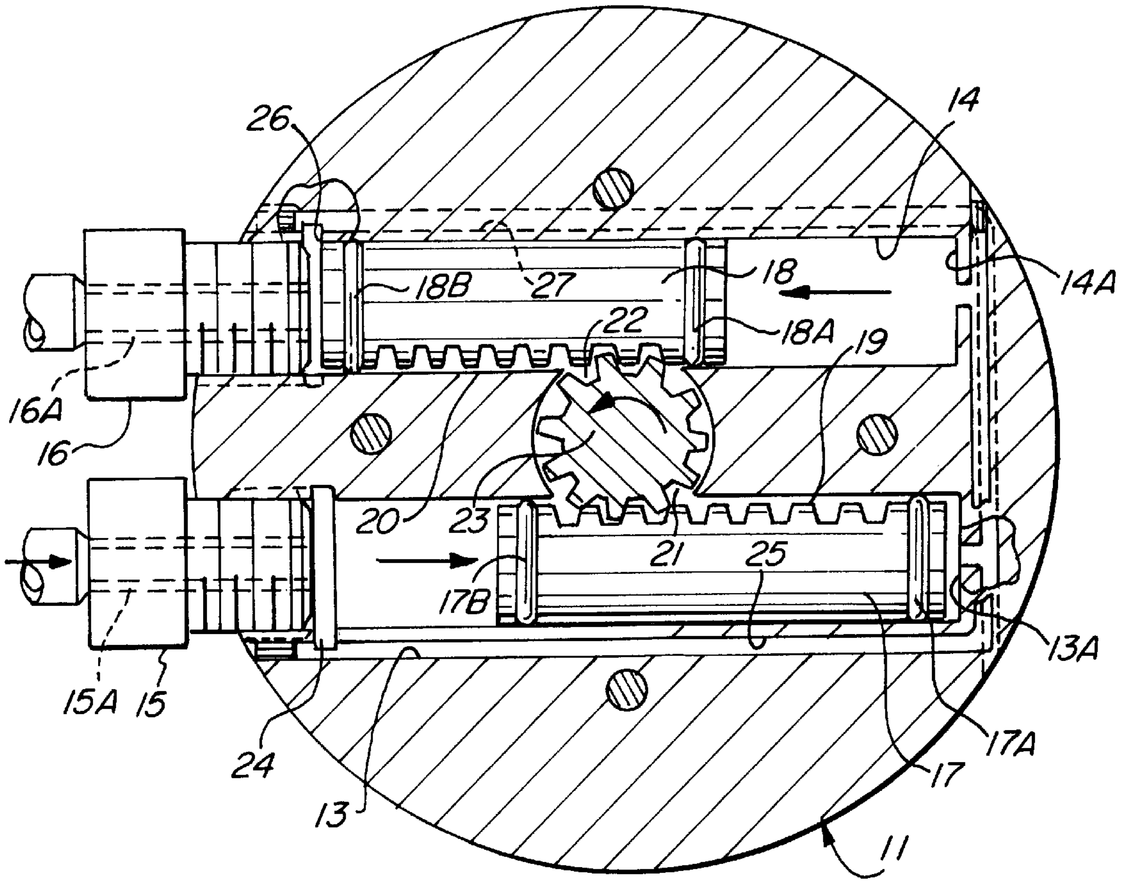
FIG. 6 is a sectional view taken along line 6—6 on FIG. 1.

As best seen in FIG. 6, the housing 12 is provided with a pair of spaced apart bores to define piston chambers 13 and 14. The respective piston chambers are closed at one end as indicated at 13A and 14A. Connected to the other end of the respective piston chambers is a nipple 15 and 16 respectively. The nipples 15 and 16 each define a fluid inlet 15A, 16A respectively, for introducing an operating fluid medium, e.g. compressed air, into its corresponding piston chamber, as will be hereinafter described.

Reciprocally disposed within each of the respective piston chambers 13 and 14 is a piston 17 and 18 respectively. Each of the respective pistons comprises an elongated member having a circumscribing sealing “O” ring 17A, 17B and 18A, 18B adjacent the opposed ends thereof. The intermediate portion of the respective pistons 17 and 28 is provided with a series of teeth to define a gear rack 19 and 20. As shown, the racks 19 and 20 of the respective pistons are oppositely disposed and spaced apart.

As best shown in FIG. 6, the respective piston cylinders 13 and 14 are provided with a window or cutout 21, 22, which are oppositely disposed to accommodate a pinion gear 23. The pinion gear 23, with its axis disposed ninety (90°) degrees to the axis of the respective pistons 17 and 18, is supported in the housing 11 with its teeth in meshing relationship with the teeth of racks 19 and 20. It will be noted that as the respective pistons 17 and 18 are reciprocated within their respective chambers 13 and 14, the pinion gear 23 is caused to rotate in either a clockwise or counterclockwise direction in accordance with the displacement of the pistons resulting from the flow of actuating fluid to each of the respective piston chambers, as will be herein described.

Passageways 25 and 27 connect the piston chambers 13 and 14 into communication with one another, as will be described. As best seen in FIG. 6, the piston chamber 13, being supplied through fluid inlet 15A with an actuating medium, is provided with an annular circumscribing groove 24, communicating with passageway 25 that connects the inlet end of piston chamber 13 to the closed end 14A of piston chamber 14. Conversely, piston chamber 14 is also provided with an annular groove 26 adjacent fluid inlet 16A communicating with a passageway 27 for connecting the inlet end of piston chamber 14 in communication with the closed end of piston chamber 13. The arrangement is such that when an actuating fluid medium, e.g. compressed air, is introduced through inlet 15A into cylinder 13 to effect displacement of the piston 17 to the right as seen in FIG. 6, a portion of the fluid medium is directed by means of passageway 25 to the closed end of piston cylinder 14 to effect simultaneous displacement of piston 18 to the left, as seen in FIG. 6. Conversely, when an actuating fluid is introduced into fluid inlet 16A, the action of the respective pistons 17 and 18 is reversed. Thus, when piston 17 is caused to be displaced to the right and piston 18 is caused to be displaced to the left, as noted by the arrows in FIG. 6, the pinion gear 23 is rotated in a counterclockwise direction. Conversely, as the respective pistons 17 and 18 are shifted in the opposite direction, the pinion gear 23 and connected rotary plate 12 are caused to rotate in the clockwise direction.

Figure 2:
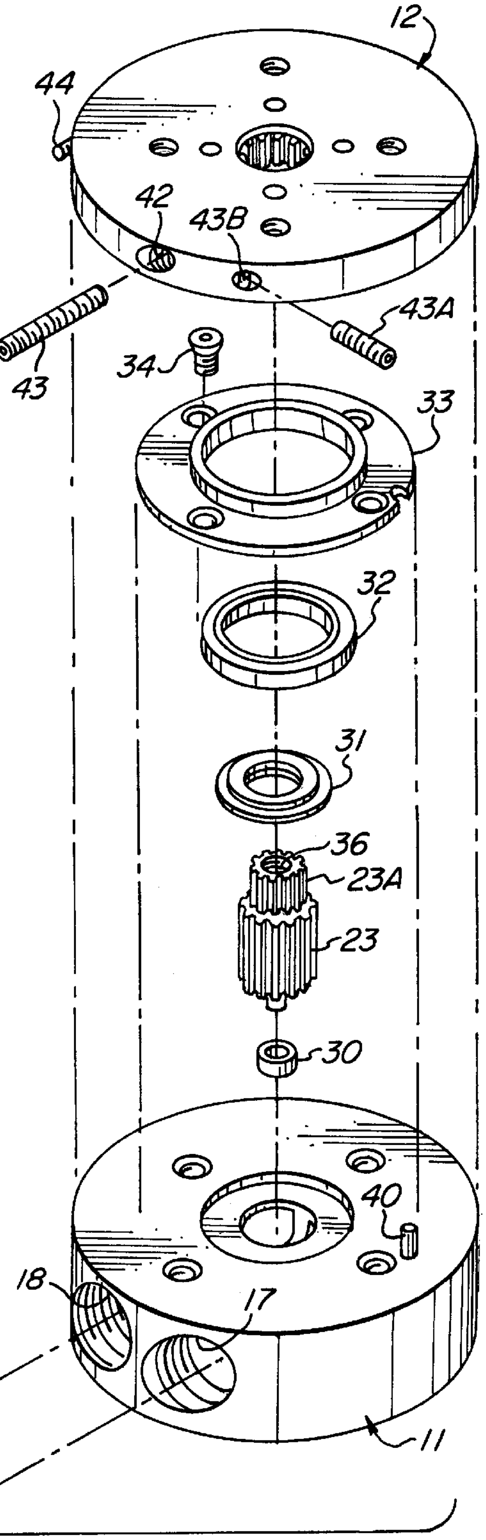
FIG. 2 is a perspective exploded view of the rotary actuator of FIG. 1.
Figure 2:
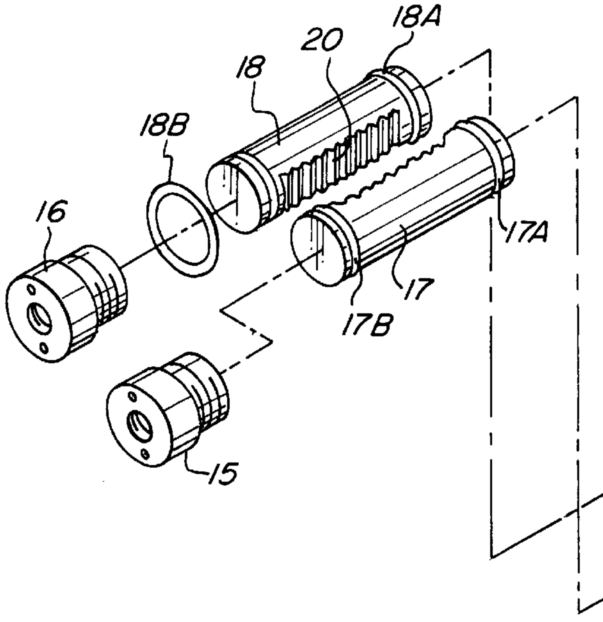

Referring to FIG. 2, the pinion gear 23 is journalled in a bearing 30 fitted in the housing. The pinion gear 23 is retained within the housing by means of a bearing and thrust washer 31. A bearing 32 is superposed onto the bearing thrust washer 31 and the assembled parts are retained within the housing 11 by a bearing retainer ring 33 secured to the housing by suitable fasteners or screws 34.

As shown in FIG. 2, the pinion gear 23 is provided with a splined projecting portion 23A to which the rotary plate 12 is mated or connected so as to be driven thereby. A suitable screw 35 threaded to a tapped hole 36 formed in the splined portion 23A secures the rotating plate 12 to the pinion gear 23, as noted in FIG. 1.

Figure 3:
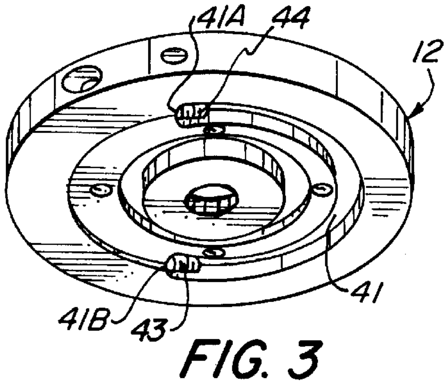
FIG. 3 is a perspective detail view of the rotary plate.

In accordance with this invention, limiting means are provided to limit the angular rotation of the rotary plate 12 in either the clockwise or counterclockwise direction. In the illustrated embodiment, the limiting means includes a stop abutment 40 in the form of a fixed pin projecting outwardly from the upper surface of the housing, as best seen in FIG. 2. The rotary plate 12 on the undersurface thereof, as best viewed in FIG. 3, is provided with a complementary groove or track 41 which is adapted to receive pin 40 in the assembled position. As best seen in FIG. 3, the groove 41 comprises an arc which is less than 360° and having opposed ends 41A, 41B. The arrangement is such that when one end of the groove 41 engages the stop abutment or pin 40, the limit of rotation of the rotary plate 12 in the given direction is determined.

Figure 4:
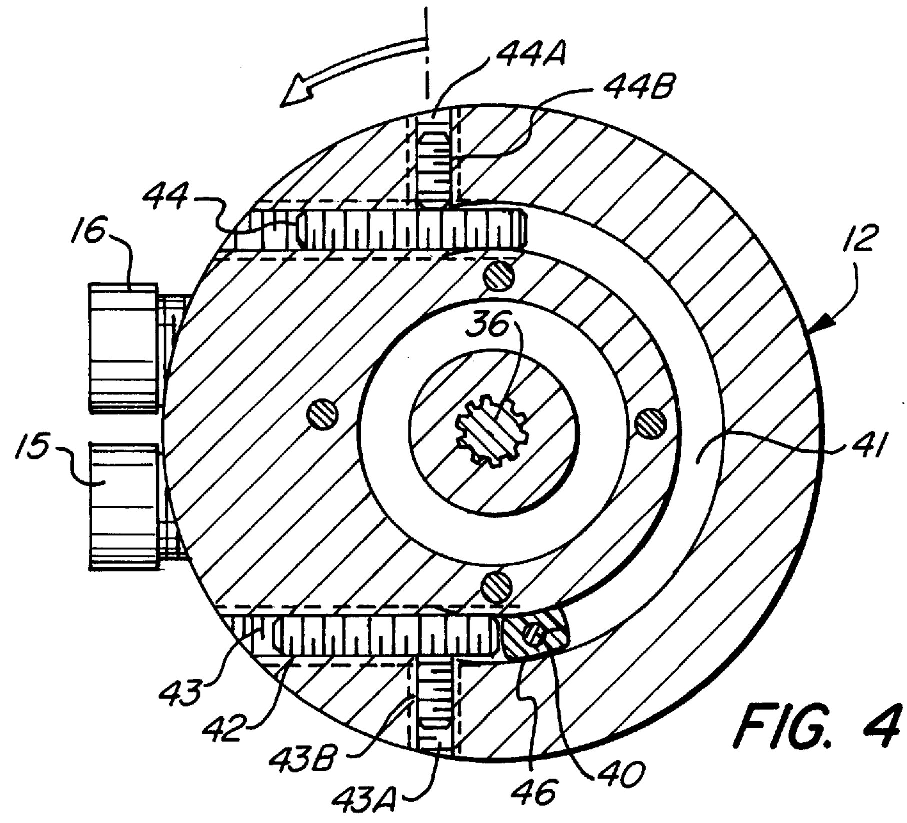
FIG. 4 is a sectional view taken along line 4—4 on FIG. 1 illustrating the limit of rotation of the rotary plate in one direction.
Figure 5:
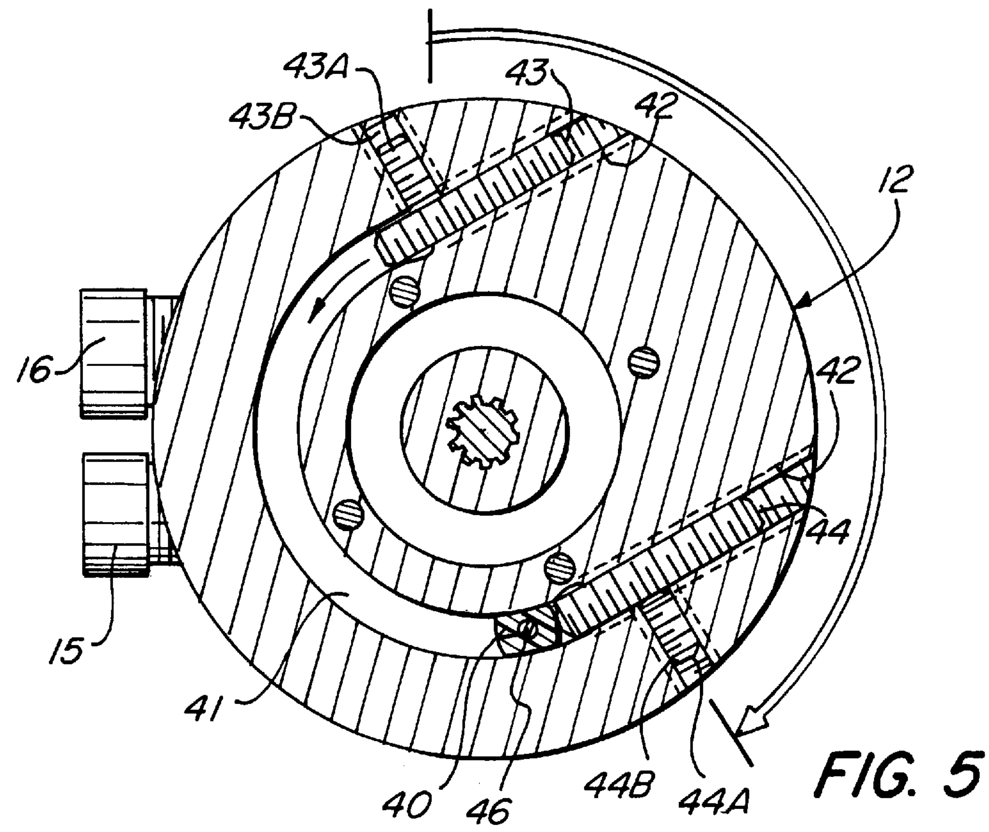
FIG. 5 is a sectional view similar to that of FIG. 4 but illustrating the limit of rotation of the rotary plate in the opposite direction.

Means are provided to fine-tune the degree of rotation of the rotary plate 12 in either the clockwise or counterclockwise direction. As best seen in FIGS. 1 and 3, a tapped hole 42 is formed in the side of the rotary plate 12 which is arranged to extend through to the end portion of the arcuate groove 41. It will be understood that two such tapped holes are provided so as to intersect with the respective opposed ends of groove 41. Threaded into each of the respective tapped holes 42 is an adjusting screw 43, 44 which is sufficiently long so as to define an adjustable end for the arcuate groove 41. The arrangement is such that by adjusting the respective screws 43, 44, the ends of the groove 41 can be adjusted, within the range permitted by the length of the adjusting screws 43, 44. To maintain the respective adjusting screws 43, 44 in their respective adjusted position, a suitable locking screw 43A, 44A is provided. As shown in FIGS. 4 and 5, tapped holes 43B and 44B are formed in the side of the rotary plate 12 at substantially right angles to tapped holes 42 for receiving a set or lock screw 43A, 44A respectively.

If desired, a suitable resilient sleeve 46 of suitable material, e.g. hard rubber, plastic or the like may be disposed about pin 40, as best seen in FIGS. 4 and 5, to absorb any impact as the end portion of the groove 41 engages the pin abutment 40.

Figure 7:
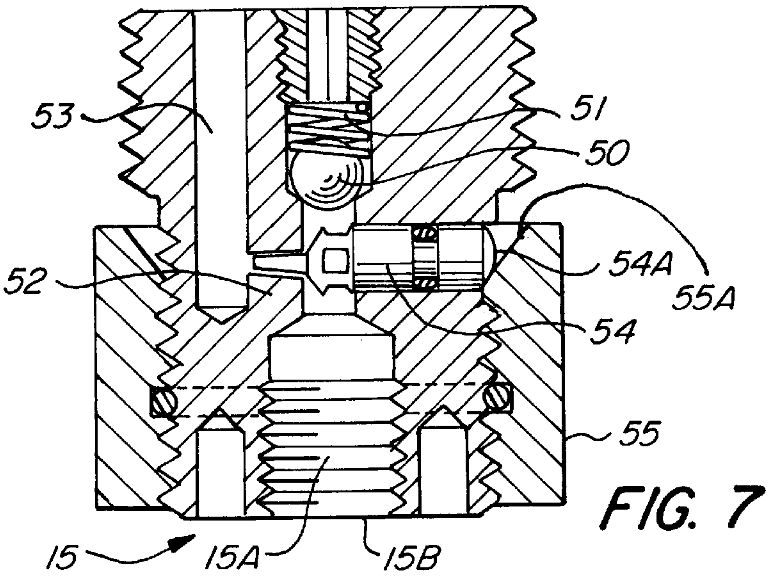
FIG. 7 is a detail view partly shown in section of the fluid inlet nipple through which an actuating medium is introduced into each of the piston chambers.

The present invention further includes a means for independently controlling the angular speed of the rotary plate in either the clockwise or counterclockwise direction. This is attained by the fluid inlet nipples 15, 16 constructed as best shown in FIG. 7. The respective nipples 15, 16 are similarly constructed. Therefore, only nipple 15 need be described.

Referring to FIG. 7, the nipple 15 is provided with an axial inlet 15A that includes a ball check valve 50 and an associated spring 51 for normally biasing the ball check valve 50 toward the closed portion. Between the inlet opening 15B and the ball check valve 50 there is provided a lateral passage 52 which connects to a bypass 53 extending parallel to the inlet passageway 15A. An adjustable needle valve 54 is arranged to valve the lateral passage 52 to control the outlet flow of fluid medium therethrough. The arrangement is such that the needle valve 54 is radially disposed so that the head end 54A projects slightly beyond the periphery of the nipple. An adjusting collar 55 is threaded onto the periphery of the nipple so as to be rotatable relative thereto. The leading end of the collar 55 is provided with an internal taper 55A arranged to engage the head end 54A of the needle valve. Thus, by effecting rotation of the collar 55 relative to the nipple, the needle valve 54 can be readily adjusted to control the flow of fluid medium exhausting through passage 52, and thereby control the speed of the rotary plate 12 accordingly. As the fluid inlet nipples 15, 16 are similarly constructed, it will be apparent that the speed of the rotary plate in either direction can be independently controlled. Thus, the rotational speed of the rotary plate 12 in one direction can vary relative to the rotational speed of the rotary plate 12 in the opposite direction and/or the respective needle valve 54 can be adjusted so that the speed of rotation of the rotary plate 12 in one direction may substantially equal the speed of rotation in the opposite direction.

With the rotary actuator described, the operation thereof is as follows:

Referring to FIG. 6, it will be noted that as the fluid medium, e.g., compressed air, is introduced into inlet 15A, the fluid pressure effects the displacement of the ball check valve 50 (FIG. 7) causing the fluid medium to enter the piston chamber 13 to effect the displacement of the piston 17 to the right. Simultaneously, the portion of the actuating fluid entering chamber 13 is directed through passageway 25 into the bottom or closed end of piston chamber 14 to effect the displacement of piston 18 to the left. The displacement of the respective pistons 17, 18 as herein described drives the pinion gear 23 and connected rotary plate 21 in a counterclockwise direction; and which rotation is limited when the end of the groove 41 engages the stop abutment 40. In the meanwhile, the air exhausting from the bottom or closed end of the piston chamber 13 is directed through passageway 27 which, together with the air exhausting from the upper or open end of piston chamber 14, is exhausted to atmosphere through the bypass 53, past the needle valve 54 and out the inlet 16A. By adjusting the setting of the needle valve 54 associated in nipple 16 by rotating collar 55 as hereinbefore described, the rate or speed of rotation of the rotary plate 12 in the counterclockwise direction can be controlled or regulated. When compressed air is introduced through inlet 16A of nipple 16, the action described is reversed, causing the pinion gear 23 and connected rotary plate 12 to rotate in the opposite or clockwise direction as viewed in FIG. 6. As the respective ball check valves 50 associated with respective nipples 15 and 16 constitute a one way valve, air or fluid medium exhausting from the piston cylinders as herein described can only exit via the bypass 53 controlled by the needle valve 54 in one of the nipples when the fluid medium is directed through the other nipple to drive the piston.

From the foregoing, it will be apparent that any stress on the pinion gear and associated racks is minimized, thereby prohibiting any backlash from occurring so as to result in maintaining the precision and accuracy of the rotary actuator 10. Also, as noted herein, the rate or speed of rotation of the rotary plate 12 can be independently controlled in either direction of rotation.

While the present invention has been described with respect to a particular embodiment, modifications and variations may be made without departing from the spirit or scope of this invention.

What is claimed is:

1. A rotary actuator comprising:

a housing, a rotary plate mounted on said housing for rotation in either a clockwise or counterclockwise direction, a drive disposed in said housing, said drive means being operatively connected to said rotary plate to effect the drive thereof in either a clockwise or counterclockwise direction, and complementary means on said housing and rotary plate for limiting the angular rotation of said rotary plate in either of said directions.

2. A rotary actuator as defined in claim 1 and including:

means for independently adjusting the speed of rotation of said rotary plate in either of said directions.

3. A rotary actuator as defined in claim 1 wherein said complementary means for limiting the angular rotation of said rotary plate comprises:

a stop abutment projecting outwardly of said housing, and a complementary arcuate groove formed in said rotary plate for receiving said stop abutment, whereby the angular rotation of said rotary plate is determined by the engagement of said stop abutment with an end portion of said arcuate groove.

4. A rotary actuator as defined in claim 3 and including an adjusting screw defining the end portion of said groove.

5. A rotary actuator as defined in claim 2 wherein said drive comprises a pair of spaced apart piston chambers formed in said housing, a piston reciprocally mounted in each of said piston chambers, each of said pistons including a rack, a pinion gear disposed between said pistons and in meshing relationship with said racks, said rotary plate connected to said pinion gear, a fluid inlet connected to each of said piston chambers, a fluid passageway for connecting each of said piston chambers in communication with one another so that a fluid medium directed to one of said fluid inlets effects the displacement of said respective pistons within its corresponding chamber to effect the drive of said pinion gear and connected rotary plate, and said means for varying the speed of rotation of said rotary plate comprising a bypass formed in said fluid inlet for exhausting the fluid medium from one of said piston chambers as the fluid medium is being directed into the other of said piston chambers, an adjustable valve for controlling the flow of fluid medium exhausting through said bypass, and an adjusting collar for controlling the setting of said adjustable valve.

6. A rotary actuator as defined in claim 5, wherein said adjusting collar is rotatably journalled on said fluid inlet, and said adjusting collar including an inner tapered surface disposed in engagement with said adjusting valve to vary the setting of said adjusting valve as said collar is rotated in one direction or the other relative to said fluid inlet.

7. A rotary actuator comprising:

a housing member having a pair of cylinder chambers therein, a piston having a rack portion reciprocally mounted in each of said chambers whereby the rack portion of each of said pistons are oppositely disposed in spaced relationship, a pinion gear disposed in meshing relationship with each of said rack portions, a rotary plate member connected to said pinion gear for rotation in a clockwise and counterclockwise direction relative to said housing member, a pair of fluid inlets, one of said fluid inlets being connected in communication with one of said cylinders for introducing an actuating fluid thereinto, a passageway connecting each of said pair of cylinder chambers into communication with one another so that an actuating fluid introduced through one of said fluid inlets effects the displacement of the respective pistons within their corresponding piston chambers in opposite directions, to effect the rotation of said rotary plate in one direction or the other accordingly, and limit means for determining the angular rotation of said rotary plate member in either direction of rotation.

8. A rotary actuator as defined in claim 7 and including means for varying the speed of the angular rotation of said rotary plate member in one direction or the other.

9. A rotary actuator as defined in claim 7, and including a complementary arcuate groove for receiving said stop abutment formed in the other of said member, whereby the limit of rotation of said rotary plate member is determined by the engagement of said stop abutment with the end of said arcuate groove.

10. A rotary actuator as defined in claim 9 wherein said arcuate groove includes adjustable ends, said adjustable ends including a set screw.

11. A rotary actuator as defined in claim 9 wherein said stop abutment is connected to a surface of said housing member projecting outwardly therefrom, and said arcuate groove being formed on the surface of said rotary plate member complementing said surface of said housing member.

12. A rotary actuator as defined in claim 8 wherein said means for varying the speed of said rotary plate comprises an exhaust bypass connected to each of said fluid inlets, a metering valve for controlling the exhausting of said actuating medium through said exhaust bypass, and means for adjusting said metering valve to control the speed of said rotary plate member.

13. A rotary actuator comprising:

a housing member having a pair of piston cylinders therein, an elongated piston reciprocally mounted in each of said piston cylinders, said piston cylinders having a length which is greater than the length of said piston reciprocally mounted therein, each of said pistons including a rack, said racks being spaced apart and directed toward one another, means defining a fluid inlet connected into communication with each of said cylinders for alternately introducing a fluid actuating medium thereinto, a fluid passageway interconnected between each said pair of cylinders whereby an actuating medium introduced into one of said fluid inlet means causes said actuating medium to be directed to each of said cylinders to effect opposite displacement of said pistons within their respective cylinders, a pinion gear disposed in meshing relationship with the respective racks of said pistons, a rotary plate member connected to said pinion gear for rotation relative to said housing, means for limiting the angular displacement of said rotary plate relative to said housing, said limiting means including a stop pin and a complementary arcuate groove for receiving said stop pin whereby the angular displacement of said rotary plate is limited thereby.

14. A rotary actuator as defined in claim 13 and including:

an adjusting means defining an end portion of said arcuate groove whereby the length of said arcuate groove is rendered adjustable within predetermined limits to determine the angular rotation of said rotary plate member accordingly.

15. A rotary actuator as defined in claim 13 and including means for controlling the exhaust rate of the fluid medium from one of said cylinders to regulate the speed of rotation of said rotary plate member accordingly.

16. A rotary actuator as defined in claim 15, wherein said means for controlling the exhaust rate of the fluid medium includes a lateral bypass interconnecting with said fluid inlet, a metering valve controlling the interconnection of said lateral bypass with said fluid inlet, said metering valve being radially disposed relative to said fluid inlet, and an adjusting means for adjusting the setting of said needle valve for regulating the rate of exhaust of said fluid medium therethrough.

17. A rotary actuator as defined in claim 16 wherein said last mentioned adjusting means includes an annular collar threaded to each of said fluid inlets, for axial movement relative to its respective fluid inlet, said annular collar having an inwardly tapering surface circumscribing the inner periphery of said collar arranged to engage said metering valve whereby the rotation of said collar in one direction or the other varies the setting of its corresponding metering valve.

18. A rotary actuator comprising:

a housing having a pair of piston chambers formed therein, said piston chambers being laterally spaced apart, a piston reciprocally mounted in each of said piston chambers, each of said pistons having a rack portion extending longitudinally thereof, said rack portions being oppositely disposed, a pinion gear interposed between and in meshing relationship with each of said piston rack portions, a fluid inlet connected into communication with each of said piston chambers, a fluid passageway interconnected between and in communication with each of said pair of piston chambers whereby the introduction of an actuating medium through one of said fluid inlets is directed to each of said piston chambers to effect the opposite displacement of said pistons within their respective piston chambers, a rotary plate, adapted to support a workpiece, connected to said pinion gear, means for limiting the angular rotation of said rotary plate, said limiting means including a stop abutment projecting outwardly of said housing, and a complementary arcuate groove formed in said rotary plate arranged to receive said stop abutment, said arcuate groove having opposed end portions whereby the angular rotation of said rotary plate is limited by the engagement of said stop abutment with one end of said complementary groove.

19. A rotary actuator as defined in claim 18 and comprising:

means for adjusting the speed of said rotary plate, said adjustable speed means including a lateral bypass in each of said fluid inlets for connecting the corresponding piston chamber in communication with its corresponding fluid inlet, a needle valve for controlling the flow of fluid medium through said bypass, and an adjusting collar for adjusting said needle valve to regulate the flow of fluid medium exhaust exhausting through said bypass.

* * * * *